UNITED STATES PATENT OFFICE.

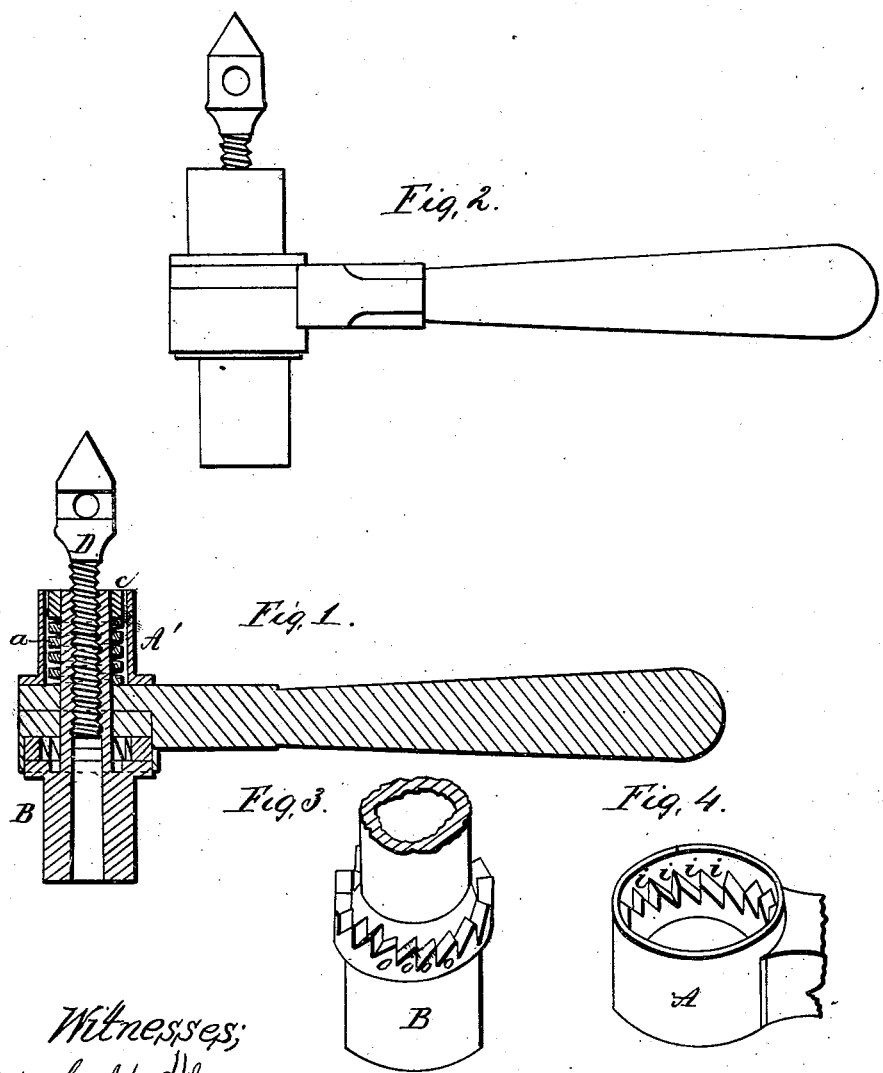

LEWIS R. BILLARD, OF NORFOLK, VIRGINIA.

RATCHET-DRILL.

Specification of Letters Patent No. 29,353, dated July 31, 1860.

*To all whom it may concern:*

Be it known that I, LEWIS R. BILLARD, of Norfolk, in the State of Virginia, have invented certain new and useful Improvements in Ratchet-Drills; and I do hereby declare that the following is a full, clear, and exact description of the same, reference being had to the accompanying drawings and to the letters of reference marked thereon.

The nature of my invention consists in constructing and arranging the several parts of this drill in the manner hereinafter set forth.

In the annexed drawings Figure 1 represents a section of the drill. Fig. 2, is a side elevation. Figs. 3 and 4 are perspective views of detached parts.

In the figures A, represents an annular box, which is provided on its inside with a rim, in which are made ratchet teeth $i\ i\ i$ as seen in Fig. 4. This box is provided with a cap A', which is secured to it and which surrounds a spring $a$, as seen in Fig. 1.

B, represents a shank, which is provided with an annular ring in which are cut teeth $o, o, o$, which are intended to catch into and correspond with the teeth $i, i, i$, in the box A. The shank B passes through the box A, as seen; and said shank being made hollow is provided about two thirds of its length with a female screw into which fits the male screw D. The bit fits into the other end of the shank B.

$c$, represents a ring around the upper portion of the shank which assists in confining the spring $a$ in proper position. The spring bears against this ring at one end and against a flange or its equivalent on the box at its other, and is for the purpose of keeping the box and the shank closely together so that the ratchet teeth will fit snugly together. I use in this drill some 16 teeth on each rim, and these teeth catching into the opposing teeth (that is the teeth on the box, catching into those on the shank,) a very strong and substantial drill is formed—a much stronger drill than can be made with simply a ratchet wheel and pawl, or ratchet.

This drill is used by entering a bit in the shank B, placing one end of the screw D against some firm obstruction and then moving the handle to and fro. As the bit enters the material against which it is pressed the screw D is turned keeping a continual pressure against it.

The advantages of this drill are its strength and durability.

I do not claim the use of the ratchet wheels; but

Having thus fully described my invention what I claim as new and desire to secure by Letters Patent is—

The arrangement of the shank B, the box A, the screw D, the ring $c$, the spring $a$, and the handle H, the screw D, passing into the shank, a portion of the shank passing into the box, with the spring $a$, intervening between them, and the handle H being secured to the box as represented, the whole being combined constructed and operated as and for the purpose specified.

L. R. BILLARD.

Witnesses:
W. S. SHEPHERD,
WM. STEVENS.